United States Patent [19]

Matteson et al.

[11] Patent Number: 5,335,234
[45] Date of Patent: Aug. 2, 1994

[54] ERROR CORRECTION CODE PIPELINE FOR INTERLEAVED MEMORY SYSTEM

[75] Inventors: Keith D. Matteson; Michael L. Longwell, both of Austin, Tex.

[73] Assignee: Dell USA, L.P., Austin, Tex.

[21] Appl. No.: 58,832

[22] Filed: May 7, 1993

Related U.S. Application Data

[63] Continuation of Ser. No. 540,983, Jun. 19, 1990, abandoned.

[51] Int. Cl.⁵ ............................................. H03M 13/00
[52] U.S. Cl. ................................. 371/40.1; 371/40.2; 371/37.5
[58] Field of Search ................... 371/40.1, 2.2, 37.5, 371/40.2; 364/231.8

[56] References Cited

U.S. PATENT DOCUMENTS

| | | | |
|---|---|---|---|
| 3,882,457 | 5/1975 | En | 340/146.1 |
| 4,375,664 | 3/1983 | Kim | 364/200 |
| 4,438,494 | 3/1984 | Budde et al. | 364/200 |
| 4,453,215 | 6/1984 | Reid | 364/200 |
| 4,564,945 | 1/1986 | Glover et al. | 371/38 |
| 4,567,594 | 1/1986 | Deodhar | 371/38 |
| 4,600,986 | 7/1986 | Scheuneman et al. | 364/200 |
| 4,608,692 | 8/1986 | Nagumo et al. | 371/37 |
| 4,633,471 | 12/1986 | Perera et al. | 371/38 |
| 4,667,286 | 5/1987 | Young et al. | 364/200 |
| 4,674,032 | 6/1987 | Michaelson | 364/200 |
| 4,698,810 | 10/1987 | Fukuda et al. | 371/38 |
| 4,730,321 | 3/1988 | Machado | 371/38 |
| 4,750,177 | 6/1988 | Hendrie et al. | 371/32 |
| 4,791,643 | 12/1988 | Molstad et al. | 371/40 |
| 4,996,687 | 2/1991 | Hess et al. | 371/10.1 |
| 5,058,051 | 10/1991 | Brooks | 364/900 |
| 5,058,163 | 10/1991 | Lubarsky et al. | 380/49 |

OTHER PUBLICATIONS

Sigal, Leon J., et al., "Concurrent Off-Phase Built-In Self-Test of Dormant Logic", Proceedings IEEE, Cat. No. 88CH2610-4, pp. 934-941, (1988).

Primary Examiner—Robert W. Beausoliel, Jr.
Assistant Examiner—Ly V. Hua
Attorney, Agent, or Firm—James Huffman; Tom Devine

[57] ABSTRACT

A data stream process pipeline and method of transferring data from a storage device to a central processor unit (CPU) or cache memory includes an input latch arrangement, error correcting circuitry, and an output latch arrangement. In embodiments of the present invention the input and output latch arrangements include two latches and means for multiplexing the outputs of the two latches.

12 Claims, 5 Drawing Sheets

ERROR CORRECTION CODE PIPELINE FOR INTERLEAVED MEMORY SYSTEM

This application is a Continuation of application Serial No. 07/540,983, filed Jun. 19, 1990, now abandoned.

CROSS REFERENCE TO RELATED APPLICATIONS

This application is related to the following U.S. patent applications:

| SERIAL NO. | TITLE | INVENTOR | FILING DATE |
|---|---|---|---|
| 490,003 | Method and Apparatus for Performing Multi-Master Bus Pipelining | Zeller, et al. | 03/07/90 |
| 529,985 | Processor and Cache Controller Interface Lock Jumper | Holman, et al. | 05/25/90 |
| (DC-00116) | Computer System Having A Selectable Cache Subsystem | Holman | 06/19/90 |
| (DC-00119) | Address Enabling System and Method for Memory Modules | Durkin, et al. | 06/19/90 |
| 532,046 | Multiple DRAM Assemblies Using a Single PCB | Holman | 05/25/90 |
| 532,045 | Power-On Coordination System and Method for Multi-Processor | Holman, et al. | 05/25/90 |
| (DC-00128) | A Digital Computer Having A System For Sequentially Refreshing An Expandable Dynamic RAM Memory Circuit | Matteson, et al. | 06/19/90 |
| 530,137 | Dual Path Memory Retrieval System for an Interleaved Dynamic RAM Memory Unit | Gaskins, et al. | 05/25/90 |
| 516,628 | Digital Computer Having an Error Correction Code (ECC) System with Comparator Integrated Into Re-Encoder | Longwell, et al. | 04/30/90 |
| 516,894 | Minimized Error Correction Bad Bit Decoder | Longwell, et al. | 04/30/90 |
| 516,606 | Shared Logic For Error Correction Syndrome Encoding | Longwell, et al. | 04/30/90 |

The above listed applications are all assigned to the assignee of this invention and are incorporated herein by reference.

BACKGROUND OF THE INVENTION

1. Field of the Invention

The present invention relates to data flow management circuitry in computer systems and, more particularly, to data pipelining for error correction/detection circuitry in computer systems using interleaved memory.

2. Description of Related Art

As is well known to those skilled in the art, a computer system consists of a number of subsystems interconnected by paths that transfer data between the subsystems. Two such subsystems are a central processing unit ("CPU") or processor and a memory and storage subsystem ("memory") which may comprise multiple memory devices. The CPU controls the operation of the computer system by executing a sequence of instructions to perform a series of operations on data. Both the instructions and the data are stored in the computer's memory as binary information, patterns of logical ones and zeros.

As is further well known to those skilled in the art, a "bus" in the computer, that is, the communications channel between the CPU and the various memory and storage devices, is inherently a bottleneck, limiting the speed at which data can be processed within the system. Virtually all instructions and all data to be processed must travel this route at least once. To maximize computer system performance, computer designers have employed different schemes to increase system processing speed including those which enhance the efficiency with which data is moved from the memory and storage devices to the CPU so that the CPU never has to wait unnecessarily for the information it needs to do its work.

Although it might seem that the most direct route to efficiently move the information might be to fill the computer with the fastest memory possible, this is impractical because even if enough such memory could be installed, the cost of such a memory would be prohibitive. Therefore, computer designers have employed a variety of devices to hold data and instructions, the choice of the repository depending upon how urgently the information might be needed by the CPU. In making the various trade-offs necessary to accomplish this, in general, fast but expensive devices are used to satisfy the CPU's immediate needs and slower but more economic devices are used to retain information for future use.

One technique used in design of personal computers to increase the speed at which the CPU can obtain access to data is that of a cache memory. This is a high speed memory device located close to the CPU in which is stored the information which the CPU is most likely to need next in its processing operations. It is statistically true that a CPU is most likely to need next the data which it most recently accessed. The next most likely is data which is immediately adjacent that which the CPU just previously accessed. For this reason, cache memory systems are configured so that the first place the CPU tries to locate the address of data which it needs for its operations is in the cache memory. If it fails to find that address in the cache, it then retrieves the data from system memory, which requires more time, and stores the new data in the cache memory for future reference. Thus, reducing the time required to retrieve data words from systems memory and store them in cache memory will enhance the overall throughput speed of a system.

Another technique of increasing the speed of a computer system is to handle the data to be processed in larger units so that more bits of data are moved through the system per unit of time. The present state of the art processors, such as the 80386 (386) and 80486 (486) microprocessors made by Intel Corporation, utilize 32 bit, so-called, double word architectures to handle data faster than the prior art processors which used 16 bit words. Similarly, storing and handling data in system memory in 64 bit units, i.e., four contiguous words of 16 bits each or two contiguous double words of 32 bits each, would also enable faster access. However, both connector pin limitations and the fact that current CPUs process data with 32 bit double words make it necessary to transmit and handle data in 32 bit units even though 64 bit wide memories can be implemented by interleaving two 32 bit memory banks. Interleaving is discussed in more detail below.

A serious limitation on the speed and reliability of computer systems is inherent in the data errors which are a fact of life for computers. Whenever data is transmitted or wherever it is stored it is vulnerable to many different forces and conditions that can physically distort the data words, changing zeros into ones and vice versa. The consequences of data errors can be devastating; a single wrong bit can change the meaning of an entire sequence of bits, perhaps throwing off a lengthy mathematical calculation or causing a computer to misinterpret a command. A number of strategies have been developed to allow computers to detect and, in some configurations, to correct errors. Error detection schemes are relatively easy and inexpensive to implement and therefore most personal computer systems include them. Error correction systems are considerably more expensive.

The most common method of detecting an error is known as parity checking. Parity checking involves counting the numbers of ones in a series of bits, and then adding a one or zero as an extra digit, known as a parity bit, to make the total number of ones come out even, for even parity systems, or odd, for odd parity systems. To confirm that the bits have not changed after each transmission or storage, the number of ones in each word are recounted, and if the result is an odd number for even parity systems, it indicates that an error has occurred. The system can then either retrieve and recreate the original data word before going on, to avoid an error, or it can simply provide a signal indicating to the user that an error has occurred.

Parity checking systems rely on an exclusive-or operation to do their counting of ones. This operation labels odd sets of ones and even sets with a 0, so coding is simply a matter of appending these results to the original data word as the parity bit. Odd sets automatically become even with the extra one, and even sets remain unchanged by the extra zero.

Parity checking works most effectively when the errors are few and far between. If there are two errors within a group of bits that share a parity bit, the number of ones will remain even and the errors will go undetected. Furthermore, parity checking cannot correct errors and is not adequate as a defense against data errors when there is a permanent defect in the memory cell or other storage element that makes retransmission ineffective as a remedy. Such situations call for more elaborate coding strategies capable of correcting the problem as well as detecting it.

Because of the inherent, two-state simplicity of binary numbers, computers can correct an error in a group of bits merely by switching a zero back to a one or vice versa. But first the computer must determine exactly which bit or bits is erroneous, and such determination requires a certain measure of ingenuity.

Various error correcting schemes are well-known to those skilled in the art including, for example, the so-called Hamming codes and Reed-Soloman codes, which each were named for their respective inventors. These techniques, which are variously designed to guard different quantities of information, combine the various data bits comprising each word in logical relationships which generate an additional set of bits known as syndrome bits which are associated with each word stored in the computer. A detailed discussion of the theory of error correction codes ("ECC") is beyond the scope of the present application. Suffice it to say that the ECC employed in the system of the present invention generates 7 syndrome bits for each 32 bit data word, producing a 39 bit word to be stored in memory. This ECC scheme is capable of single bit error correction and double bit error detection.

As discussed above, interleaving can also be used to enable the faster handling of data in a computer system. For example, the system of the present invention stores data in 64 bit blocks in the main memory, but because the processor and ECC circuitry only handles 32 bit double words, interleaving is used to handle the entry and retrieval of each pair of 32 bit double words comprising a 64 bit block (actually each 32 bit data word comprises 39 bits, since with ECC each word also includes 7 syndrome bits, so that a total 78 bit block is formed).

Needless to say, unifying ECC and interleaving to handle large virtual words in memory into a simple, efficient system is very difficult. Although a number of computer systems have been heretofore developed, these prior art systems have not efficiently used error correction circuitry in a system including interleaved memory, in which only one signal is used to latch the data and in which the system allows 64 bits of data to be read from memory at a time, rather than 32, to significantly increase the system throughput.

SUMMARY OF THE INVENTION

The present invention provides a computer pipeline that efficiently incorporates error correction circuitry into a system having an interleaved memory and requires the use of only a single signal to latch data through the pipeline. The system of the present invention also allows 64 bits of data to be read from memory at a time, rather than 32, which significantly increases system throughput.

The system of the present invention includes a computer pipeline which interconnects a data storage device and a processor or cache memory, includes error correcting means, means for latching data into the error correcting means, and means for latching data out of the error correcting means. The means for latching data out of the error correcting means is operable simultaneously with the means for latching data into the error correcting means.

In various embodiments of the present invention, the means for latching data into the error correcting means includes an enabling latch arrangement comprising two "in" latches and two "out" latches. Multiplexing means may be connected in circuit between each of the two "in" latches and the error correcting means. Multiplexing means may also be connected circuit between each of the two "out" latches and the processor and/or cache memory.

The present invention further provides a method and circuit for transferring data from one storage device to another and/or to a processor. This method and circuit for transferring data includes latching a first portion of a data block into a data channel narrower than the width of the block and then latching the data back into a full width block. One aspect of the invention includes employing a single enable signal to pipeline the data into, through and out of the system. In another aspect, the invention includes the steps of latching the data into an error detecting and/or correcting means and latching the data out again. In the method and circuit of the present invention, one of the storage devices may be a DRAM and this DRAM may have two banks of interleaved memory.

Also according to the teachings of the present invention, a data pipeline includes means for transferring a block of data having a certain width, and a channel portion narrower than the certain width, and wherein the means for transferring the block of data includes means for transferring the block of data through the channel portion. This pipeline can interconnect an interleaved memory system and a processor and/or a cache memory.

Further according to the present invention, in a computer system having a cache memory and an interleaved memory, a fast pipeline for transferring data blocks having a certain width from the interleaved memory to the cache memory includes a channel portion having a width smaller than the certain width, and means for transferring the data blocks through the channel portion.

Accordingly, it is a primary object of the present invention to provide a high throughput error correction code pipeline for interleaved memory.

BRIEF DESCRIPTION OF THE DRAWINGS

For a more complete understanding of the present invention, and for further objects and advantages thereof, reference may now be had to the following description taken in conjunction with the accompanying drawings in which.

DETAILED DESCRIPTION OF THE INVENTION

Figure 1A:
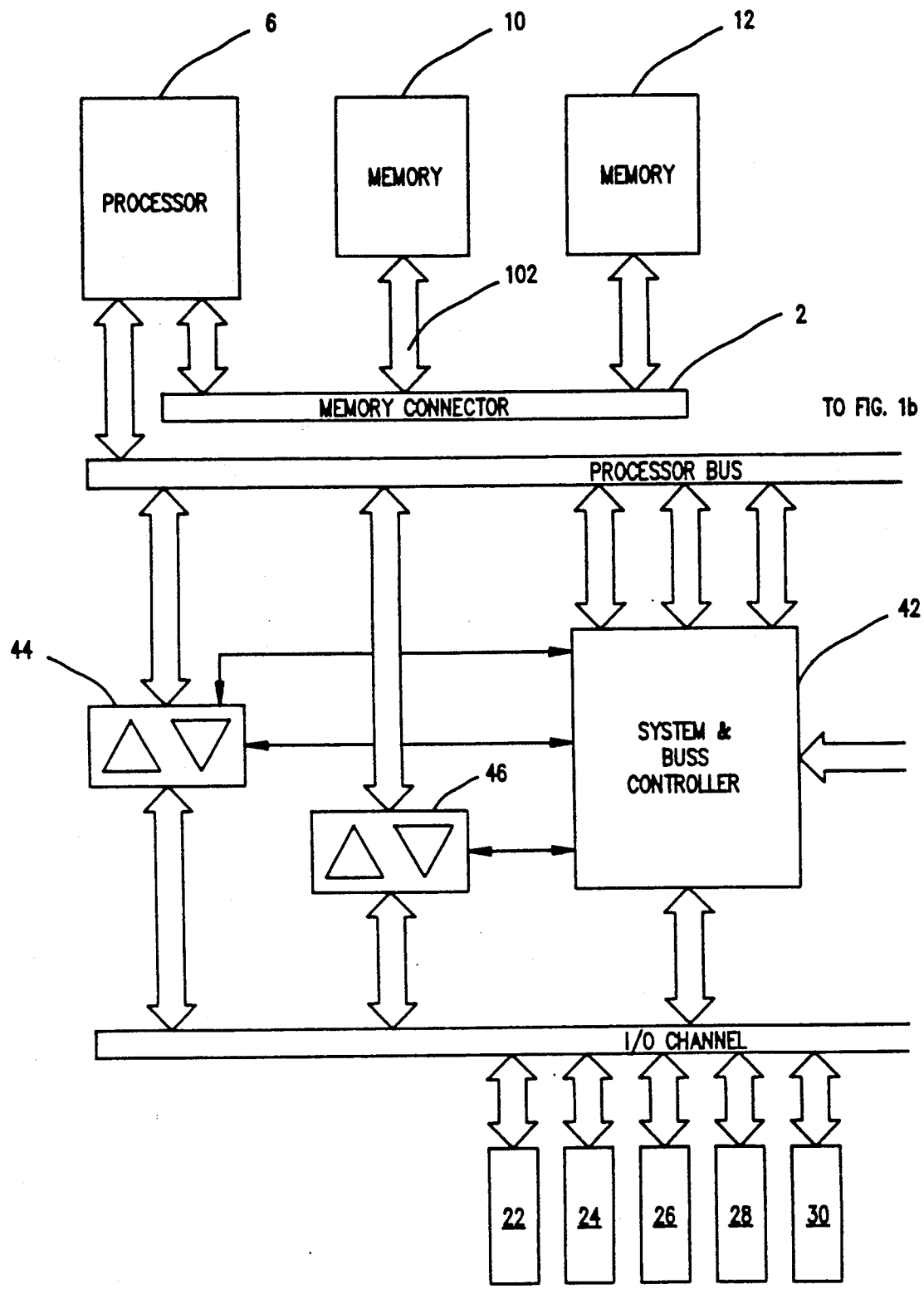
FIG. 1A is a left-hand portion of a top level block diagram of a computer system.
Figure 1B:
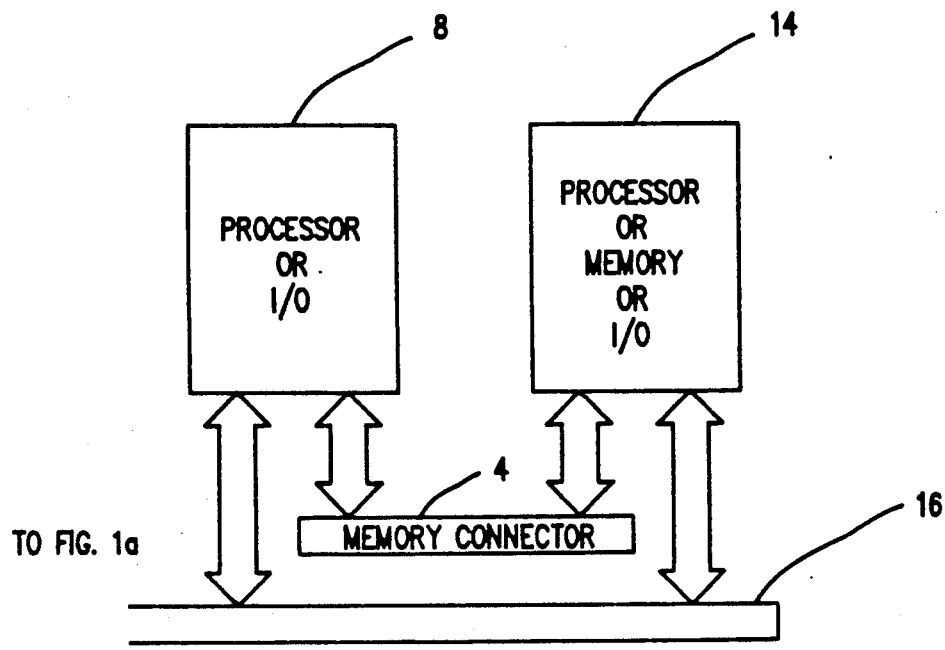
FIG. 1B is a right-hand portion of a top level block diagram of a computer system.

Referring now to the drawings wherein like reference numerals designate identical or similar elements throughout the several views, depicted in FIGS. 1A and 1B, taken together, is a general high level block diagram of a computer system. The present invention will herein initially be considered at this level, and at a number of successive, more detailed levels, to ensure full understanding and appreciation of the role and operation of the present invention in an environment in which it could be usefully employed.

FIG. 1A and 1B, taken together, show a personal computer system employing the system of the present invention shows four main buses which represent the major interfaces at the top level. These buses are a first memory connector 2 and a second memory connector 4 (which are private interfaces between processors 6, 8 and their dedicated memories 10, 12 and 14, respectively), a processor bus 16 (a multiple master bus which is the architectural break between the processing units, e.g., elements 6, 8, and I/0 18, and perhaps also 14, and an I/0 channel 20 (e.g., a standard interface which may be ISA, EISA or microchannel).

The processor bus 16 performs various functions. First, it serves as a connection between the processors 6, and 8, and intelligent I/0, and/or processor 14; all system memory 10, 12 and external memory 14; and the system I/0 channel 20 and I/0 expansion slots 22, 24, 26, 28, 30, 32, 34, 36, 38, 40. System memory 10, 12 and 14 may be configured as a virtual 64 bit interleaved memory with two associated banks for storage of one 32 bit double word each, one odd and one even. Thus, the processor bus 16 allows each processor 6, 8 to access another processor's 8, 6 memory. This access is allowed "through" the processor that is directly connected to the memory. That is, when a processor connected to the processor bus 16 requests access to a location in some other processor's memory, the other processor completes the access locally, receiving the address from the processor bus 16 and transferring the data from and to the processor bus 16. Additionally, the processor bus 16 serves as a communication link between processors 6, 8 and 14. Through interprocessor communication mechanisms (the details of which are not critical to the present invention and, for that reason, are not set forth therein), each processor can address and interrupt each other processor.

In addition to the foregoing, the processor bus 16 also acts as the interface between the processor memory complexes and the I/0 18. Through a system and bus controller 42 addresses and data are translated between the processor bus 16 and the I/0 channel 20 through a set of transceivers 44, 46 (such as Model 74ALS245 transceivers made by Texas Instruments Incorporated). Through this interface, the processor bus master can access the system I/0 and peripherals 18 as well as the I/0 expansion slots 22, 24, 26, 28, 30, 32, 34, 36, 38, 40. Still further, the processor bus 16 acts its the data path for I/0 to I/0 accesses. The system and bus controller 42 generates "action codes" which format the protocol necessary for inter-device communication and enable intelligent cards plugged into all I/0 expansion slot to access other I/0 cards or even the processor bus memory.

System and bus controller 42, in addition to providing routing information and action code generation, handles all processor bus 16 arbitration and interfaces all control signals to the system I/0 18 (such as ISA "commands", DMA control signals, and interrupts).

Figure 2:
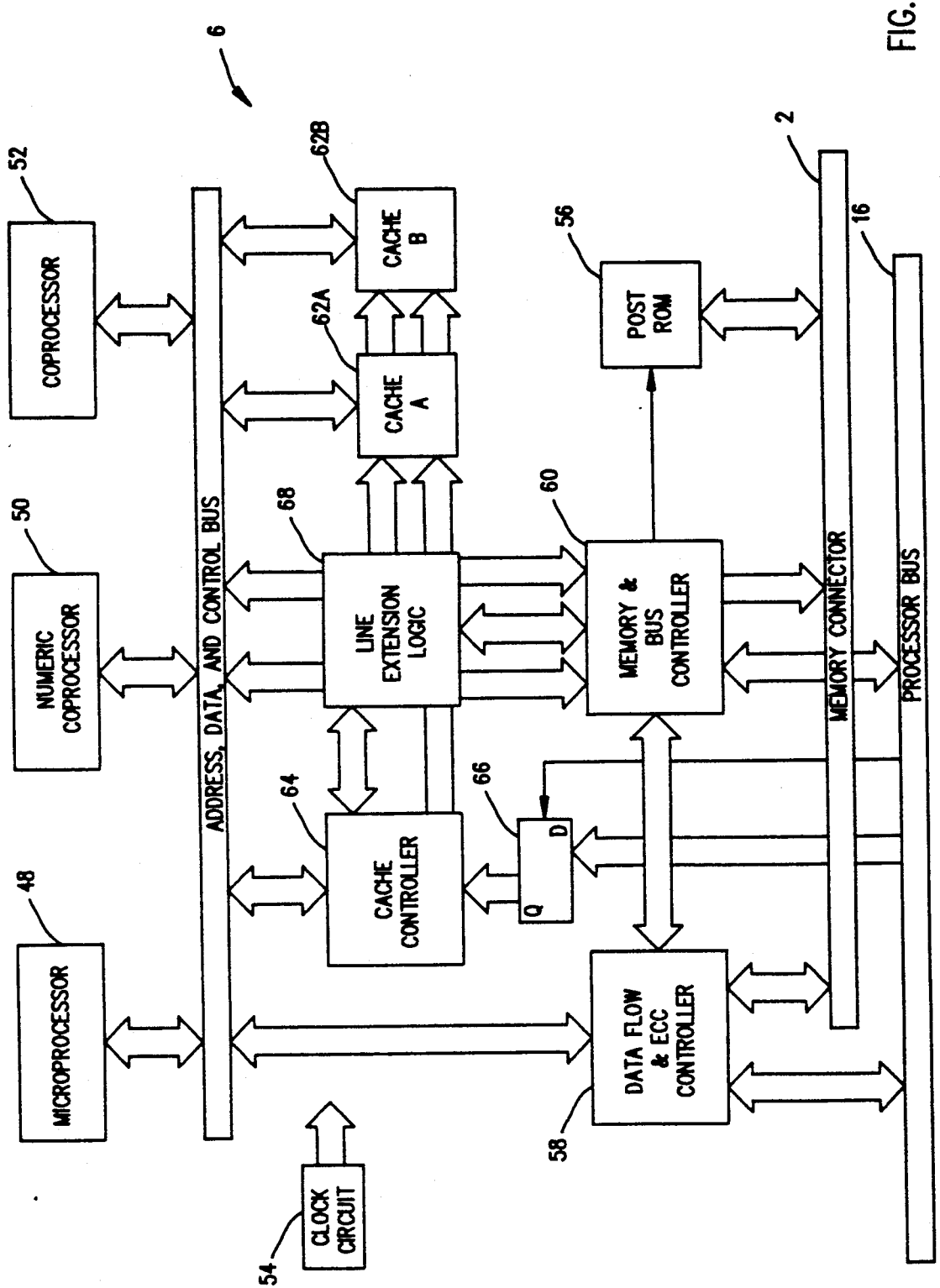
FIG. 2 is a block diagram of a processor module such as could be employed in the computer system of FIGS. 1A and 1B.

Referring now to FIG. 2, there is shown a block diagram of the major components of a processor card. With reference to FIGS. 1A and 1B, taken together, this processor module 6 can be seen to interface with the rest of the computer system through memory connector 2 and Processor bus 16.

Processor module 6 includes a microprocessor 48 (e.g., an Intel 80386), a numeric coprocessor 50 (e.g., an Intel 80387), an optional coprocessor 52 (e.g., a Weitek 3167), a cache subsystem (discussed below), a clock circuit 54, a POST ROM (Power On, Self Test, Read Only Memory) 56, a data flow and ECC controller 58, and a memory and bus controller 60.

The cache subsystem includes a cache memory (shown as consisting of two separate banks 62A, 62B of SRAMs and a cache controller 64 (e.g., an Intel 82385). As should be understood by those skilled in the art, the cache subsystem functions as an extremely fast, "sketchpad-like" memory which provides rapid access to the data most frequently needed by the processor. The system of the present invention may employ cache memory with cache line sizes of 4 double words each so that if a cacheable read is made by the processor, the memory controller returns 4 sequential double words into the cache from system memory. Optimizing the speed with which this operation occurs from a pair of interleaved 32 bit, double word memory banks and through error correction and/or detection circuitry is one of the principal goals of the system of the present invention, as discussed below.

For systems with a cache 62A, 62B, a snoop address latch 66 would likely be included capture each processor address that is generated in order to invalidate addresses if necessary. Additionally, in systems with a cache memory, a programmable array logic (PAL) line extension logic 68 is included to control address and control signals passing between the cache 62A, 62B, cache controller 64, and memory and bus controller 60.

The processor module 6 also includes local address, data and control buses (indicated by the various arrows shown in FIG. 2) that interconnect the microprocessor 48, coprocessors 50, 52 and cache 62A, 62B, as well as the data flow and ECC controller 58 and memory and bus controller 60. These buses are used for local cycles such as ROM 56 reads, coprocessor cycles and cache read hits. Access to the ROM 56 can be accomplished via operation of the data flow and ECC controller 58, and memory and bus controller 60. For global cycles such as cache writes, cache read misses, non-cacheable cycles, and I/0 cycles, however, the processor module 6 must complete its access off-board.

For off-board cycles, the memory and bus controller 60 decodes the local address and control signals and determines whether the access is destined for the processor bus 16 or for the dedicated memory. For a memory cycle, the memory and bus controller 60 generates the memory control signals (i.e., RAS, CAS and WE) and addresses to access the memory card. The memory and bus controller 60 also generates refresh signals to the memory card, e.g., element 10, for each refresh period. In conjunction with the memory bus controller 60, the data flow and ECC controller 58 also performs error checking and correction.

For off-board cycles that are not destined for the memory card 10, the memory and bus controller 60 generates a processor bus request signal and takes control of the processor bus 16 when it is granted. Again, working in conjunction with the data flow and ECC controller 58, the memory and bus controller 60 completes the access to the processor bus 16.

Figure 3:
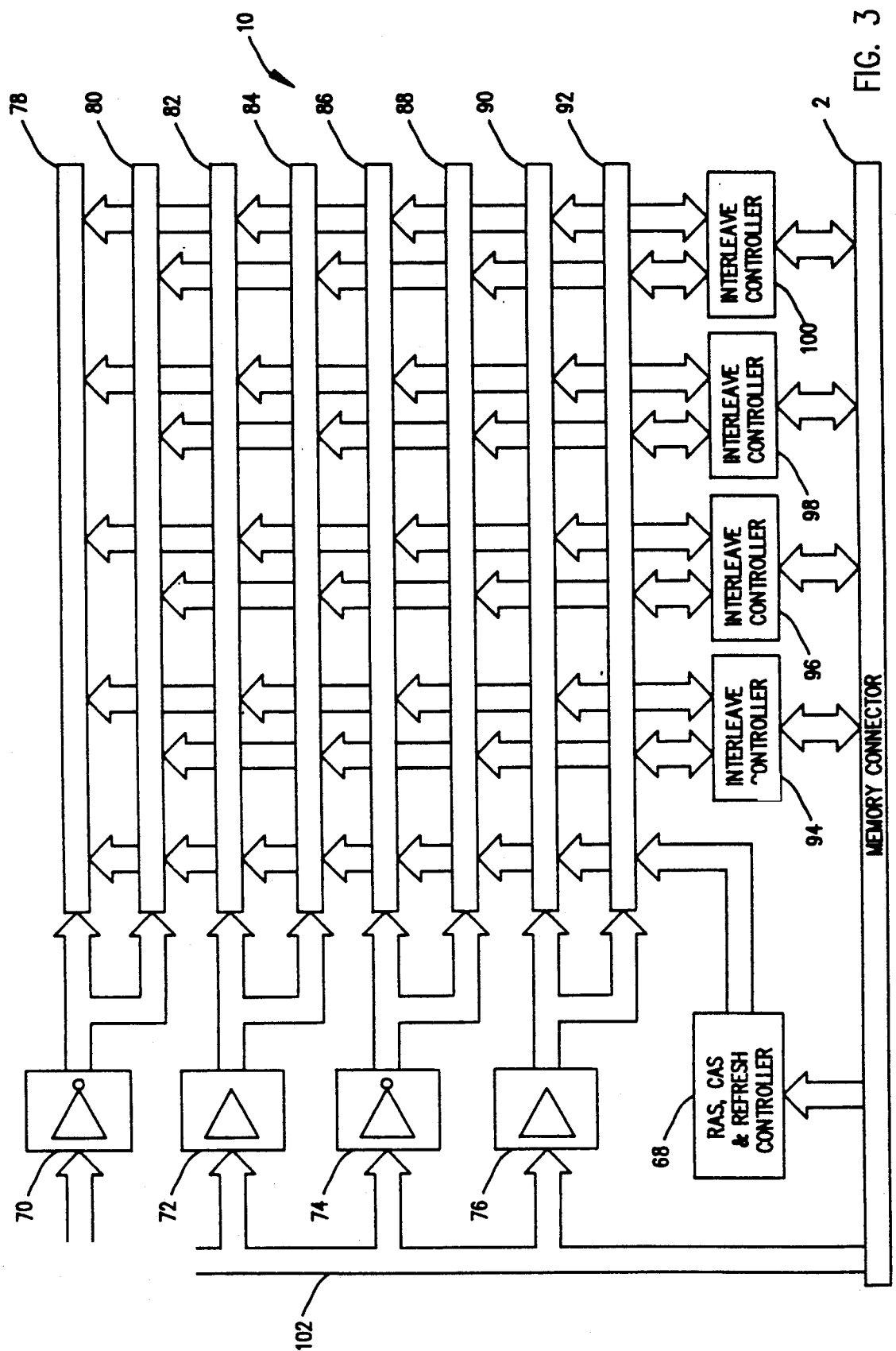
FIG. 3 is a block diagram of a memory module such as could be employed in the computer system of FIGS. 1A and 1B.

Referring now to FIG. 3, a block diagram of the major components of a memory card 10 is set forth therein. With reference to FIGS. 1A and 1B, taken together, the memory card 10 interfaces to the rest of the system through the memory connector 2.

Figure 1B:
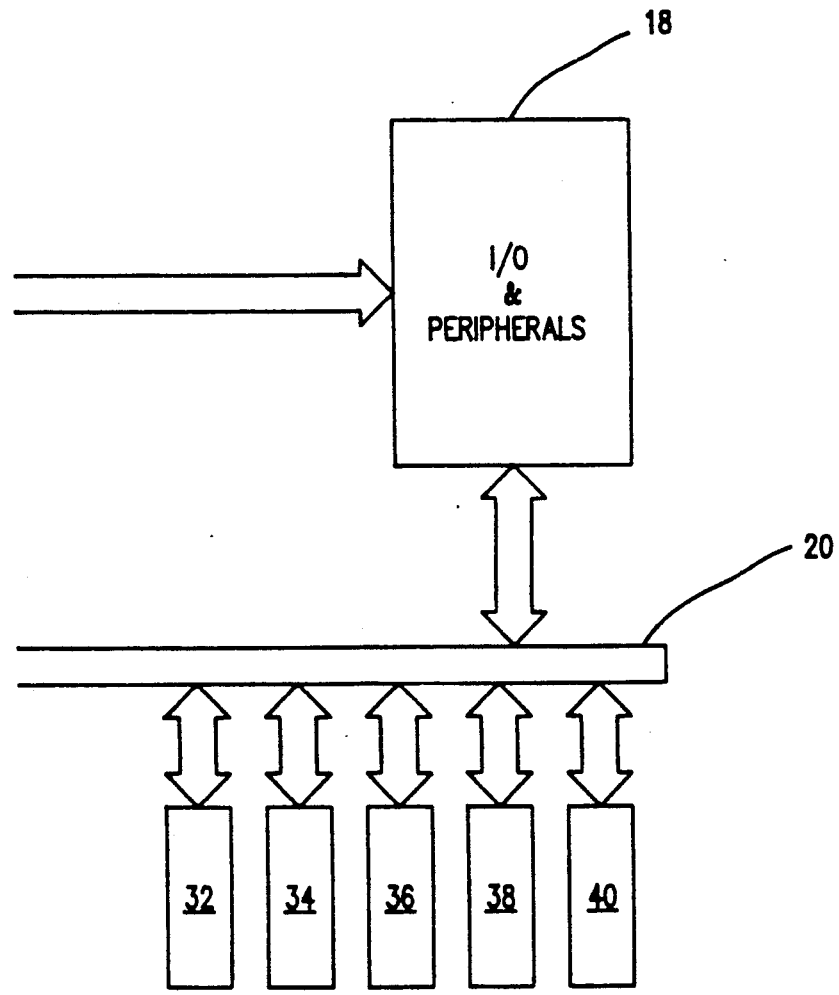

As discussed above, each memory card 10 preferably implements storage of virtual 64 bit words in the form of 2 interleaved banks of 32 bit double words, one odd and one even. Each card 10 includes a RAS, CAS, and refresh controller 68, four address buffers 70, 72, 74, 76, eight single in-line memory (SIMM) slots 78, 80, 82, 84, 86, 88, 90, 92, and four interleave controllers 94, 96, 98, 100. The RAS, CAS, and refresh controller 68 receiver control signals from the memory interface 102 (See FIG. 1), which is driven by the memory and bus controller 60 (see FIG. 2), and then, in turn, drives the control signals to the SIMM slots 78, 80, 82, 84, 86, 88, 90, 92 for reads, writes and refreshes. Each of the four interleave controllers 94, 96, 98, 100 multiplexes eight bits of data between the memory connector 2 and the SIMM slots 78, 80, 82, 84, 86, 88, 90, 92.

As will be explained in greater detail below, the data is split between even and odd banks of 32 bits of data in order to accomplish true interleaving. That is, for each read, 64-bits of data is accessed, and the four interleave controllers 94, 96, 98, 100 select 32-bit (either even or odd data) for the current access. A subsequent access can be completed in a single processor clock cycle because the second 32-bit double word is already accessed and latched. As previously mentioned, the memory card 10 includes address buffers 70, 72, 74, 76 and SIMM slots 78, 80, 82, 84, 86, 88, 90, 92. By way of example only, Model 74FCT828 and 74FCT827 data buffers manufactured by VTC could be used as the address buffers 70, 72, 74, 76. Inverting (74FCT828's) and non-inverting (74FCT827's) buffers are used to minimize the average address line signal switching to minimize electrical noise. The SIMM slots 78, 80, 82, 84, 86, 88, 90, 92 could be adapted to accommodate either 1, 2, 4 or 8 Mbyte SIMMs with parity or ECC organization.

Figure 4:
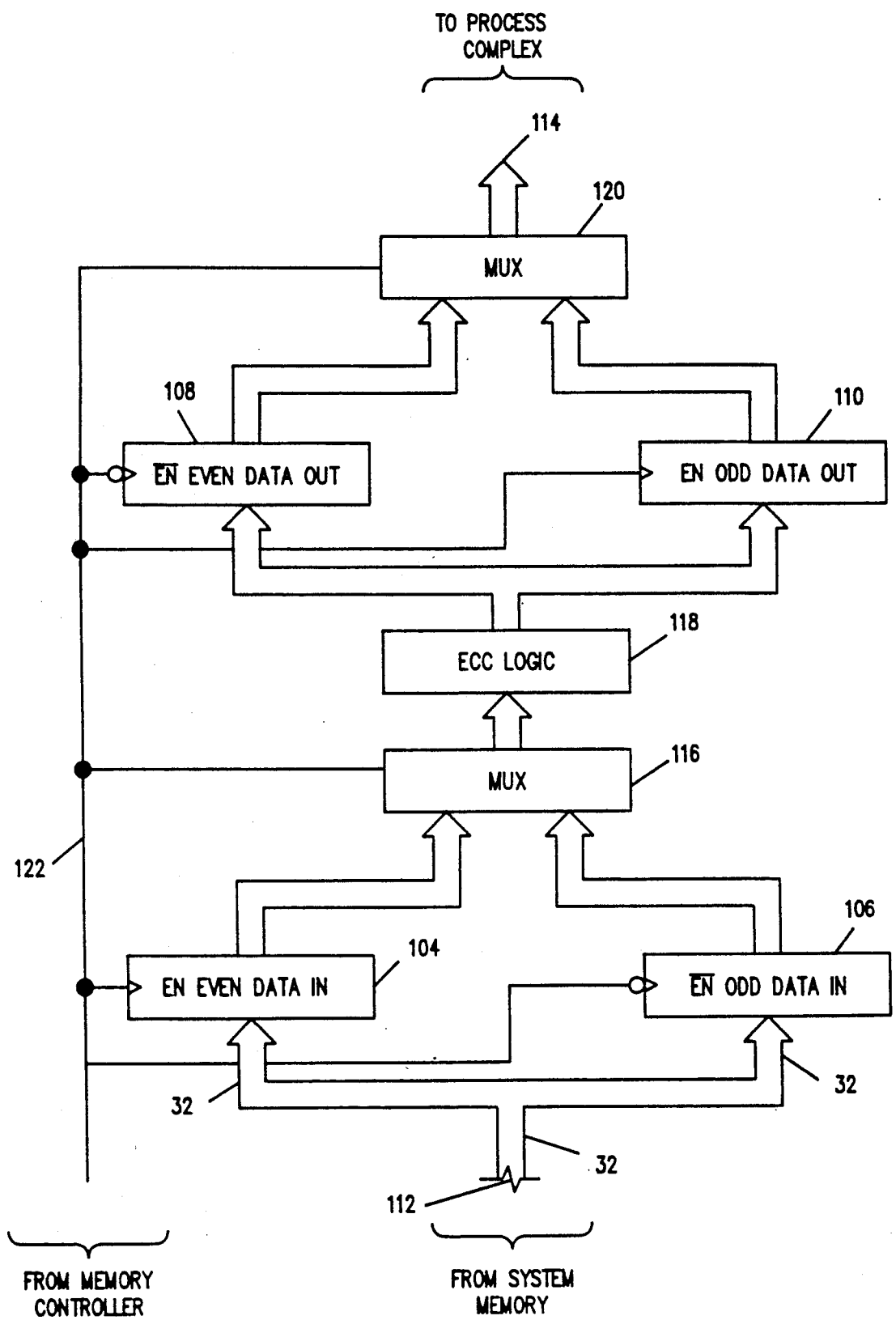
FIG. 4 is a block diagram of an error correction code pipeline for interleaved memory systems according to the present invention.

Referring now to FIG. 4, a block diagram of an error correction code pipeline for interleaved memory according to the present invention is shown therein. Recalling FIGS. 1, 2, 3 and the discussions accompanying those FIGS., it may now be fully appreciated that the circuitry shown in FIG. 4 resides in the data flow and ECC controller 58 (see FIG. 2) and that this circuitry operates on data flowing from memory 10 (see FIGS. 1A, 1B and 3) to processor (see FIGS. 1A, 1B and 2) through memory connector 2.

Recalling now particularly the discussion of the overall computer system with regard to FIG. 3, 64-bits of data are accessed on each memory read. Efficient and rapid movement this 64-bit wide output to a 32-bit processor through a 32-bit path is part of the present invention. Additionally, the pathing and method of the present invention accomplishes an error checking and/or correcting operation on the data being transferred from system memory to cache memory and/or the microprocessor.

To accomplish the foregoing, a preferred embodiment of the present invention includes a first latch arrangement and a second latch arrangement. The first latch arrangement includes two "in" latches 104, 106 and the second latch arrangement includes two "out" latches 108, 110. The first and second latch arrangements are, as previously stated, connected in circuit between memory 10 and processor 6. Point 112 in FIG. 4 indicates that point in the depicted circuit closest to memory 10 and point 114 in FIG. 4 indicates that point in the depicted circuit closest to processor 6.

Continuing to refer to FIG. 4, it may be seen that in the illustrated embodiment of a pipeline according to the present invention, a first multiplexer 116 is connected in circuit between the first latch arrangement (comprising latches 104 and 106) and certain ECC logic 118. Still further, a second multiplexer 120 may be seen connected in circuit between the second latch arrangement (comprising latches 108 and 110) and point 114 (i.e., a point towards processor 6).

The ECC logic element 118 constitutes circuitry performing an error detecting and/or correcting function. Parity checking circuitry may form part of this circuitry 118, as may various error correction type logic as discussed above. The ECC circuitry employed in this invention is set out in detail in co-pending patent applications, Ser. Nos. 07/516,628, 07/516,894 and 07/516,606, all filed on Apr. 30, 1990, and listed in the Related Applications section of this application.

In essence, the pipeline of the present invention comprises a system of latches which latch data from one bank of memory (e.g., a DRAM) to the input side of an ECC circuit while, simultaneously, results from the other bank of the memory are being latched out of the ECC circuit. In the practice of the present invention, only one signal is used to latch the data. Whereas prior art pipelines conventionally require a complete transfer from input through an ECC circuit to a processor before new data can be presented to the inputs of the ECC system, the present invention allows loading of new data while old data is being decoded. Thus, for interleaved memory systems, the data path is optimized and while, in this preferred embodiment, 8 clock cycles are required to transport the first word through the circuitry of FIG. 4, a word is received on each clock cycle thereafter. Sixty-four bits of data can be read at a time rather than thirty-two, doubling system throughput.

Referring again to FIG. 4, a EVEN-ENABLE signal, capable of going high or low, is placed on line 122 by the memory controller, where it may control each of the latches 104, 106, 108, 110 and multiplexers 116, 120. When the EVEN-ENABLE signal is high the transparent latch 104 labeled EVEN DATA IN will have the value of the input bus (i.e., the bus at point 112) on its outputs. When EVEN-ENABLE switches to low, the latch 104 will retain that value on its outputs, the multiplexer 116 will output the EVEN DATA IN bits to the ECC logic element 118, where the ECC logic element 118 will correct any single bit errors and indicate any double bit errors. The corrected data will, after a logic delay, be input to the EVEN DATA OUT and ODD DATA OUT latches 108, 110. The EVEN DATA OUT latch 108 will be transparent while the EVEN-ENABLE signal remains low. Also while the EVEN-ENABLE signal remains low, the ODD-DATA-IN latch 106 will be transparent. During this time the external logic will be changing the value of the input data bus from EVEN DATA to ODD DATA, and the ECC circuit 118 will be decoding the EVEN DATA stored in the EVEN DATA IN latch 104.

When EVEN-ENABLE switches from low to high, the corrected EVEN DATA is latched into the EVEN DATA OUT latch 108 which will retain this value on its outputs; the ODD DATA IN latch 110 will close, retaining the value of the ODD DATA on its outputs; the multiplexer 116 will switch to enable the ODD DATA IN latch 106 data into the ECC logic 118; and the EVEN DATA IN latch 104 will be enabled. At this time, the external logic will be changing the value of the input data bus from the ODD DATA to the next EVEN data. Also during this time the value in the EVEN DATA OUT latch 108 is output to the processor complex, executing cache line fills therein.

When EVEN-ENABLE switches from high to low, the same sequence takes place, causing the second even data to be latched into EVEN DATA IN 104 and input to the ECC logic 118, the ODD DATA IN latch 106 to be enabled, and the first corrected ODD DATA to be latched into ODD DATA OUT 110 and output to the processor complex, while the EVEN DATA OUT latch 108 is enabled.

This sequence will repeat for as long as required for the necessary number of double words (32 bits) to be transferred from the memory to the processor. The cache line size could, as discussed above, for example, be 4 double words; however, the technique of the present invention could be used advantageously in any system with a cache line size of 2 or more double words.

When the last double word has been latched into the input side, the EVEN-LATCH signal must be toggled once more to latch the corrected data to the DATA OUT latch. This will cause erroneous data to be latched into the other input latch, but this data will never be output to the processor.

The system of the present invention allows practitioners to take advantage of the fast access of 64 bits of data (plus associated syndrome or checksum bits) in an interleaved fashion. If the throughput of the memory system is fast enough to match the processor cache system, the data can flow through the ECC logic at the same rate. This only requires that the ECC logic be able to decode the data within the time between EVEN-ENABLE switching. In a 25 MHz 386 system this requires decode within 40 ns, in a 33 MHz 386 system this requires decode within 30 ns.

It should also be apparent that the system of the invention can be used to pipeline data of a block size through a data channel of a smaller width. The data can then be reassembled into a full width block thereafter.

It is thus believed that the operation and construction of the present invention will be apparent from the foregoing description. While the method and apparatus described and shown have been characterized as being preferred, it will be obvious that various changes and modifications may be made therein without departing from the spirit and scope of the invention.

What is claimed is:

1. A digital computer system having all error correcting data pipeline between an interleaved storage device having first and second memory banks and a receiving device, the pipeline comprising:
    (a) an input latch mechanism, electrically connected to said first and second memory banks, for alternately transmitting first and second portions of data received from said first and second memory banks of said storage device:
    b) all output latch mechanism, electrically connected to said receiving device, for alternately transmitting first and second portions of corrected data to said receiving device;
    (c) error correcting circuitry (ECC) connected between said input and output latch mechanisms for alternately receiving said first and second portions of said data from said input latch mechanism, correcting errors in said data and sending said first and second portions of said corrected data to said output latch mechanism; and
    (d) a control signal electrically corrected to said input latch mechanism, said output latch mechanism, and said error correcting circuitry for simultaneously latching 1) one of said first and second portions of said data from said first and second memory banks to said input latch mechanism, 2) one of said first and second portions of said data from said input latch mechanism to said error correcting circuitry, 3) one of said first and second portions of said corrected data to said output latch mechanism;
    (e) wherein said data from said interleaved storage device is alternately latched into said input latch mechanism for error correction, and alternately provided from said error correcting circuitry to said output latch mechanism as corrected data.

2. The system of claim 1 wherein the input latch mechanism comprises an EVEN input latch responsive to one level of an ENABLE signal, and an ODD input latch responsive to another level of the ENABLE signal.

3. The system of claim 2 wherein the output latch mechanism comprises an EVEN output latch responsive to the other level of the ENABLE signal, and an ODD output latch responsive to the one level of the ENABLE signal.

4. The system of claim 3 further comprising an input multiplexer connected to receive the input data from the EVEN and ODD input latches, and to send the input data to the ECC.

5. The system of claim 4 further comprising an output multiplexer connected to receive the corrected data from the ECC and to send the corrected data to the receiving device.

6. The system of claim 5 wherein the first and second memory banks comprise interleaved even and odd memory banks.

7. The system of claim 6 wherein the even memory bank is connected to the EVEN input latch and the odd memory bank is connected to the ODD input latch.

8. A method of transferring data in a digital computer system from an interleaved storage device having first and second memory banks and a receiving device, the system including error correcting circuitry (ECC), comprising the steps of:
 (a) alternate transmitting first and second portions of data received from the first and second memory banks of the storage device to the ECC;
 (b) correcting errors in the data to provide corrected data; and
 (c) alternately transmitting first and second portions of corrected data to the receiving device from the ECC.

9. The method of claim 8 further comprising the step of generating a bi-level ENABLE signal by the system for latching the new data into the ECC and simultaneously latching the corrected data out of the ECC.

10. The method of claim 9 wherein the system includes an EVEN input latch and an ODD input latch, further comprising the step of applying one level of the ENABLE signal to the EVEN input latch, and applying the other level of the ENABLE signal to the ODD input latch.

11. The method of claim 10 wherein the storage device comprises even and odd of interleaved memory, further comprising the step of alternately inputting data from the even bank into the EVEN input latch and data from the odd bank into the ODD input latch.

12. The method of claim 11 further comprising the step of multiplexing data from the EVEN input latch or from the ODD input latch into the ECC.

* * * * *